(12) United States Patent
Han et al.

(10) Patent No.: US 11,412,486 B2
(45) Date of Patent: Aug. 9, 2022

(54) METHOD AND APPARATUS FOR RESOURCE COLLISION AVOIDANCE ON SIDELINK

(71) Applicant: LENOVO (BEIJING) LIMITED, Beijing (CN)

(72) Inventors: Jing Han, Beijing (CN); Xiaodong Yu, Beijing (CN); Lianhai Wu, Beijing (CN); Haiming Wang, Beijing (CN); Haipeng Lei, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 182 days.

(21) Appl. No.: 16/966,080

(22) PCT Filed: Jan. 31, 2018

(86) PCT No.: PCT/CN2018/074773
§ 371 (c)(1),
(2) Date: Jul. 30, 2020

(87) PCT Pub. No.: WO2019/148376
PCT Pub. Date: Aug. 8, 2019

(65) Prior Publication Data
US 2020/0374859 A1    Nov. 26, 2020

(51) Int. Cl.
*H04W 72/04* (2009.01)
*H04W 92/18* (2009.01)

(52) U.S. Cl.
CPC ..... *H04W 72/0406* (2013.01); *H04W 72/042* (2013.01); *H04W 92/18* (2013.01)

(58) Field of Classification Search
CPC ............. H04W 72/02; H04W 72/0406; H04W 72/042; H04W 92/18
See application file for complete search history.

(56) References Cited

U.S. PATENT DOCUMENTS

| 11,212,774 | B2* | 12/2021 | Min | ................... H04W 72/0493 |
| 2016/0094283 | A1 | 3/2016 | Zhu et al. | |
| 2020/0137738 | A1* | 4/2020 | Liu | ....................... H04L 5/0044 |
| 2020/0221271 | A1* | 7/2020 | Kim | ........................ H04W 4/40 |

FOREIGN PATENT DOCUMENTS

| CN | 105164957 A | 12/2015 |
| CN | 106993332 A | 7/2017 |
| CN | 107484254 A | 12/2017 |

OTHER PUBLICATIONS

PCT/CN2018/074773, "International Search Report and the Written Opinion of the International Search Authority" ISA/CN, State Intellectual Property Office of the P.R. China, Sep. 27, 2018, pp. 1-8.

* cited by examiner

*Primary Examiner* — Thomas R Cairns
(74) *Attorney, Agent, or Firm* — Kunzler Bean & Adamson

(57) ABSTRACT

Method and apparatus for resource collision avoidance on sidelink are disclosed. One method of apparatus includes determining reserved resource on SL for a following SL transmission; transmitting information of the reserved resource to a mode 4 UE in a resource reservation field in SCI. Further, the reserved resource on SL is determined according to DCI received from a base station. Further, a resource guarantee indication, which indicates whether the reserved resource indicated in the resource reservation field in the SCI can be occupied by the mode 4 UE, is transmitted to the mode 4 UE.

26 Claims, 7 Drawing Sheets

METHOD AND APPARATUS FOR RESOURCE COLLISION AVOIDANCE ON SIDELINK

FIELD

The subject matter disclosed herein relates generally to wireless communication and more particularly relates to resource collision avoidance on Sidelink.

BACKGROUND

The following abbreviations and acronyms are herewith defined, at least some of which are referred to within the following description.

Third Generation Partnership Project ("3GPP"), Positive-Acknowledgment ("ACK"), Channel State Information ("CSI"), Control Channel ("CCH"), Dynamic Scheduling ("DS"), Device-to-Device ("D2D"), further enhancement Device-to-Device ("feD2D"), Downlink Control Information ("DCI"), Downlink ("DL"), Evolved Node B ("eNB"), European Telecommunications Standards Institute ("ETSI"), Frequency Division Duplex ("FDD"), Frequency-Division Multiplexing ("FDM"), Frequency Division Multiple Access ("FDMA"), Long Term Evolution ("LTE"), LTE Advanced ("LTE-A"), Multiple Access ("MA"), Machine Type Communication ("MTC"), Narrowband ("NB"), Negative-Acknowledgment ("NACK") or ("NAK"), Orthogonal Frequency Division Multiplexing ("OFDM"), Physical Downlink Control Channel ("PDCCH"), Physical Downlink Shared Channel ("PDSCH"), Physical Sidelink Control Channel ("PSCCH"), Physical Sidelink Shared Channel ("PSSCH"), Physical Uplink Control Channel ("PUCCH"), Physical Uplink Shared Channel ("PUSCH"), Quality of Service ("QoS"), Radio Network Temporary Identity ("RNTI"), Identity Radio Resource Control ("RRC"), Resource Reservation Field ("RRF"), Receive ("RX"), Scheduling Assignment ("SA"), Scheduling Request ("SR"), Shared Channel ("SCH"), Sidelink Control Information ("SCI"), System Information Block ("SIB"), Sidelink ("SL"), Semi-Persistent Scheduling ("SPS"), Transport Block ("TB"), Transport Block Size ("TBS"), Transmission Control Protocol ("TCP"), Time Division Duplex ("TDD"), Time-Division Multiplexing ("TDM"), Transmission Time Interval ("TTI"), Transmit ("TX"), Uplink Control Information ("UCI"), User Datagram Protocol ("UDP"), User Entity/Equipment (Mobile Terminal) ("UE"), Uplink ("UL"), Universal Mobile Telecommunications System ("UMTS"), Vehicle-to-Vehicle ("V2V") and Vehicle-to-Everything ("V2X"), Vehicle-to-Infrastructure/Network ("V2I/N"), Vehicle-to-Pedestrian ("V2P").

In order to expand the LTE system to the automotive industry, the initial standard on support for V2V services was completed in September 2016. Further enhancements included in Release 14 (Rel-14), which focus on additional V2X operation scenarios leveraging the cellular infrastructure, was completed in March 2017. Currently, 3GPP TSG SA (Service and System Apects) WG1 (Working Group 1) is working on the enhancement of 3GPP support for V2X services in a work item of FS_eV2X (study for enhanced V2X). SA WG1 has identified 25 use cases for advanced V2X services which are categorized into four groups of use cases: vehicles platooning, extended sensors, advanced driving and remote driving. The consolidated requirements for each group are captured in TR 22.886.

In Release 15 (Rel-15), it is expected to enhance the Cellular-based V2X services (V2V, V2I/N, and V2P) as identified in TR 22.886 in a holistic and complementary manner as respect to V2X in Rel-14, which will involve enhancements for both Uu interface and PC5 interface.

One of the objectives for this study is radio resource pool sharing between UEs using mode 3 and UEs using mode 4, wherein UEs using mode 3 and mode 4 are also referred as mode 3 UE(s) and mode 4 UE(s) respectively herein. Radio resource for Mode 3 UE is scheduled by eNB, while radio resource for Mode 4 UE is autonomously selected from a resource pool by itself, as defined in Rel-14. In Rel-14, resource pools for mode 3 and mode 4 are orthogonal configured to avoid resource collision between mode 3 and mode 4. The reason of the orthogonal configuration is that there is no indication for SA to indicate the reserved resource for mode 3 UE, that is, the resource reservation field in SCI is set to be 0. In another aspect, mode 4 UE, which autonomously select radio resources, cannot get the knowledge of reserved resource for mode 3 UE. Thus, the resource collision is avoided by orthogonal configuration of resource pools in Rel-14, which has an impact on the resource utilization.

In Rel-15, radio resource pool sharing between mode 3 UE and mode 4 UE is studied, to enhance the resource utilization, as well as to solve some problems of resource collision, which is caused by the lack of resource coordination between mode 3 UE and mode 4 UE, e.g. pre-configured resource for mode 4 UE has overlap with resource for mode 3 UE configured by eNB, or inter-PLMN case etc.

In another aspect, it is expected that the resource coordination between mode 3 UE and mode 4 UE reuse the legacy SA format, which can be decoded by Rel-14 UEs, without causing significant degradation to Rel-14 PC5 operation compared to that of Rel-14 UEs.

BRIEF SUMMARY

Enhancements to resource pool sharing between mode 3 UE and mode 4 UE require increased resource utilization, as well as the avoidance for resource collision. However in the case that resource for mode 3 UE is scheduled by eNB while resource for mode 4 UE is autonomously selected from a resource pool, mode 4 UE may have no knowledge of reserved resource for mode 3 UE by eNB. Moreover, significant signaling overhead is not expected, and the compatibility for Rel-14 UEs are need to be considered. Thus, it is preferred that the legacy SA format is reused to avoid the resource collision.

Method and apparatus for resource collision avoidance on sidelink are disclosed. One method of mode 3 UE for resource collision avoidance on sidelink includes determining reserved resource on SL for a following SL transmission; transmitting information of the reserved resource to a mode 4 UE in a resource reservation field in SCI.

Further, the reserved resource on SL is determined according to DCI received from a base station.

Further, a resource guarantee indication, which indicates whether the reserved resource indicated in the resource reservation field in the SCI can be occupied by the mode 4 UE, is transmitted to the mode 4 UE.

In another aspect, one method of a network equipment for resource collision avoidance on sidelink includes determining reserved resource on SL for a following SL transmission; transmitting information of the reserved resource to a mode 3 UE in DCI.

Further, a resource reservation field in the DCI scrambled with SL-V-RNTI is used to transmit the information of the reserved resource and set a reserved resource field in SCI.

Further, a SL SPS configuration field in the DCI scrambled with SL-SPS-V-RNTI is used to transmit the information of the reserved resource, and a SL SPS configuration index included in the SL SPS configuration field in the DCI is used to set a reserved resource field in SCI.

In another aspect, one method of mode 4 UE for resource collision avoidance on sidelink includes receiving information of reserved resource on SL from a mode 3 UE in a resource reservation field in SCI; determining existence of resource collision on SL.

Further, resource reselection is performed in the case that the reserved resource has collision with resource used by the mode 4 UE for an ongoing SL transmission.

Further, the reserved resource is excluded from a resource pool in the case that the reserved resource has not collision with resource used by the apparatus for an ongoing SL transmission.

The method and apparatus herein not only increase the resource utilization by radio resource sharing between mode 3 UEs and mode 4 UEs, but also resolve a problem of resource collision in resource sharing scenario. Further, the compatibility for Rel-14 UEs is considered without introducing significant signaling overhead due to the reuse of legacy SA format.

BRIEF DESCRIPTION OF THE DRAWINGS

A more particular description of the embodiments briefly described above will be rendered by reference to specific embodiments that are illustrated in the appended drawings. Given that these drawings depict only some embodiments and are not therefore to be considered to limit scope, the embodiments will be described and explained with additional specificity and detail through the use of the accompanying drawings, in which.

DETAILED DESCRIPTION

Figure 1:
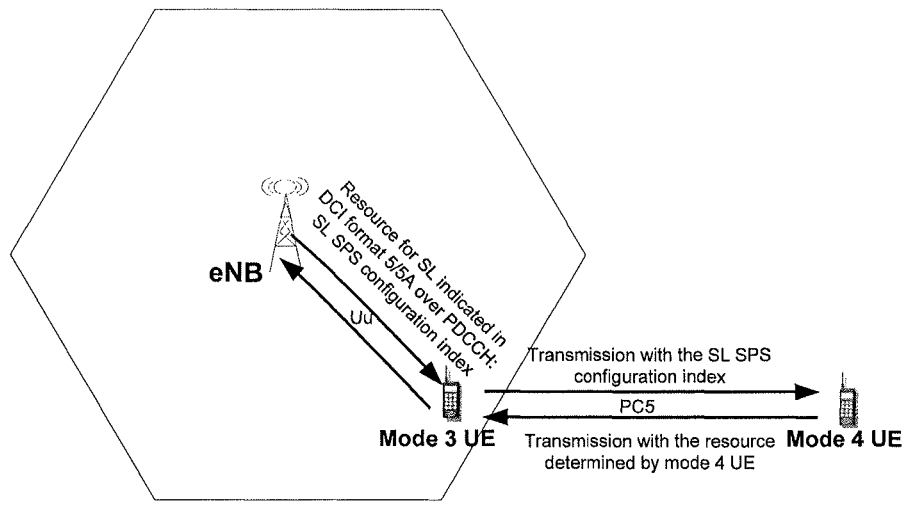
FIG. 1 is a schematic diagram illustrating transmission for mode 3 UE and mode 4 UE on sidelink.

As will be appreciated by one skilled in the art, aspects of the embodiments may be embodied as a system, apparatus, method, or a program product. Accordingly, embodiments may take the form of an all-hardware embodiment, an all-software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred to hereafter as code". The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but is not limited to being, an electronic, magnetic, optical, electromagnetic, infrared, holographic, micromechanical, or semiconductor system, apparatus, or device, or any suitable combination of the foregoing.

A non-exhaustive list of more specific examples of the storage device may include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but not limited to", unless expressly specified otherwise. An enumerated listing of items does not imply that any or all of the items are mutually exclusive, unless expressly specified otherwise. The terms "a", "an", and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions—executed via the processor of the computer or other programmable data processing apparatus—create a means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code executed on the computer or other programmable apparatus provides processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown in the Figures, and are able to be practiced without one or more of the specific steps, or with other steps not shown in the Figures.

It should also be noted that, in some alternative implementations, the functions noted in the block may occur out of the order noted in the Figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated Figures.

The description of elements in each figure may refer to elements of proceeding figures. Like numbers refer to like elements in all figures, including alternate embodiments of like elements.

Enhancements to resource pool sharing on SL should be studied to increase resource utilization, in order to meeting requirements for QoS, reliability, complexity and power consumption, and further more to enable use cases for advanced V2X services. However, resource collision may occurs on SL in the case that the resource pool is shared between mode 3 UE and mode 4 UE. Disclosed herein are methods, apparatuses, and systems that provide a technical solution of resource collision avoidance on SL in the case of the resource pool sharing between mode 3 UE and mode 4 UE. Further, RRF in SCI is determined according to DCI from a base station such as eNB, particularly DCI format 5A, and used by mode 3 UE to indicate the reserved resource for a following SL transmission. Alternatively, a resource guarantee indication is used to indicate whether the reserved resource indicated in the resource reservation field in the SCI can be occupied by the mode 4 UE.

In another aspect, the base station such as eNB may use RRF or SL-SPS-Config field in DCI being scrambled with SL-V-RNTI or SL-SPS-V-RNTI respectively to indicate the reserved resource for SL transmission. Additionally, the RRF in DCI may indicate an interval between current scheduled resource and the reserved resource for SL transmission of mode 3 UE. Alternatively, the RRF in DCI is set by a SL SPS configuration index, and an interval between the current scheduled resource and the reserved resource for SL transmission of mode 3 LIE is same with a SPS interval corresponding to the SL SPS configuration index.

FIG. 1 is a schematic diagram illustrating transmission for mode 3 UE and mode 4 UE on sidelink. As shown in FIG. 1, mode 3 UE is in the coverage of an eNB, while mode 4 UE is out of the coverage. It is noted that mode 4 UE may be in the coverage of another eNB which is not shown in FIG. 1, but has no communication with the shown eNB. The resource on SL for mode 3 UE is scheduled by the eNB using DCI format 5/5A over PDCCH. For example, the eNB schedules a SL transmission resource with a SL SPS configuration index in the case that the resource allocation for SL transmission is based on SPS. In the case that the resource allocation for SL transmission is based on DS, the eNB explicitly indicates the scheduled resource in DCI format 5A. Mode 3 UE performs SL transmission using the scheduled resource such as the SL SPS configuration index allocated by the eNB on PC5 interface. Mode 4 UE autonomously selects resource for SL transmission from a resource pool, and performs SL transmission with the select resource on PC5 interface.

Figure 2:
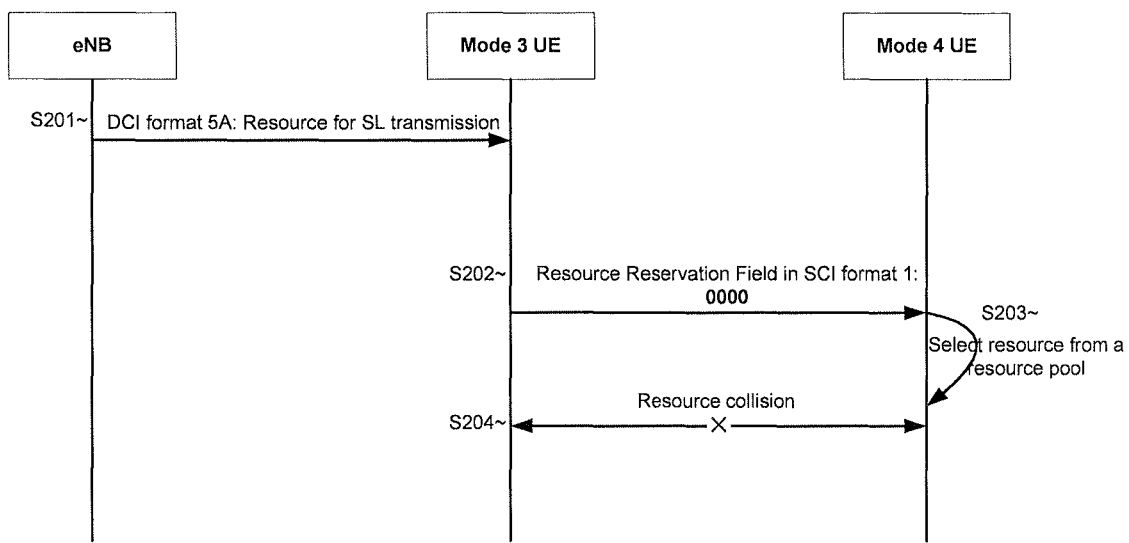
FIG. 2 is a call flow illustrating that resource collision occurs on SL in the prior art.

FIG. 2 is a call flow illustrating that resource collision occurs on SL in the prior art. In the context of FIG. 1, in S201, eNB transmits a DCI format 5A to mode 3 UE, in order to indicate the resource for SL transmission, wherein the resource can be scheduled based on DS or SPS. In S202, Mode 3 UE transmits SCI format 1 on PSCCH to indicate the current scheduled resource for mode 3 UE transmission, wherein RRF in SCI is set to be '0000' in the prior art. Thus mode 4 UE cannot conclude the resource for a following SL transmission of mode 3 UE. In step S203, mode 4 UE autonomously selects resource for SL transmission from a configured resource pool, and the selected resource may be overlapped with the resource for a following SL transmission of mode 3 UE. That is, in step S204, the resource collision occurs on SL, thereby the transmission from both mode 3 UE and mode 4 UE is impacted, and the transmission performance and efficiency are decreased.

Additionally, in the case that the resource allocation for SL transmission is based on SPS, mode 3 UE can deduce the resource for a following SL transmission from the SL SPS configuration index, and then set the RRF in SCI with the information of interval corresponding to the SL SPS configuration index. However, study has not been developed yet for the case that the resource allocation for SL transmission is based on DS. Disclosure herein can contribute both cases of SPS and DS.

Figure 3:
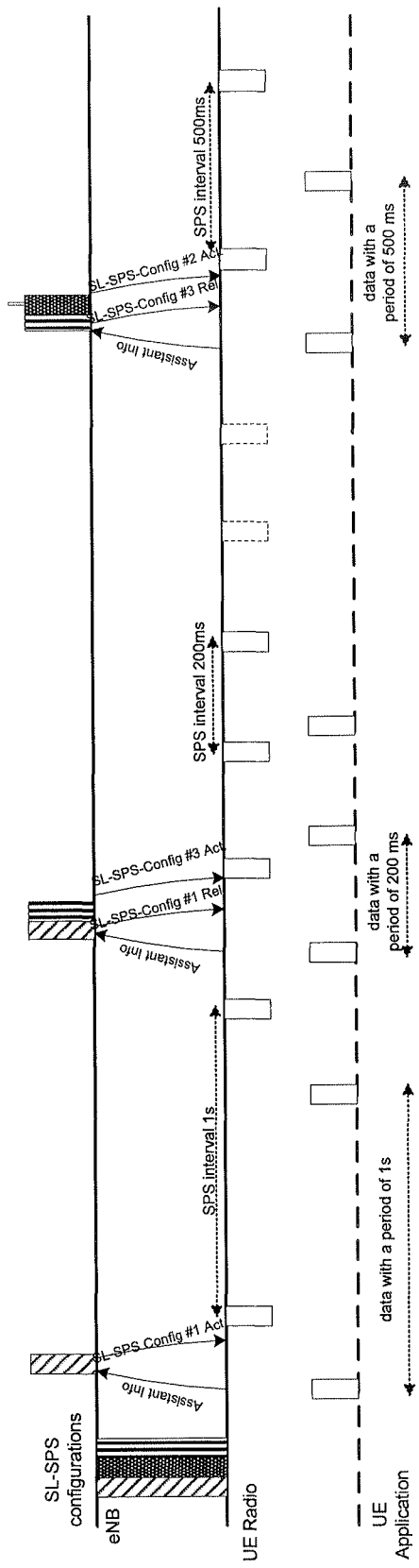
FIG. 3 is a schematic diagram illustrating transmission with SPS configurations.

FIG. 3 is a schematic diagram illustrating transmission with SPS configurations. To support more allocations in cellular communication, without increasing the size of the PDCCH, semi-persistent scheduling (SPS) can be adopted. The UE is pre-configured by the eNB with an SPS-RNTI (allocation ID) in the case of SPS. Once pre-configured, the allocation would be repeated and the UE would receive/decode a resource allocation (DL/UL) using the SPS-RNTI (instead of the typical C-RNTI) in a pre-configured interval without UE periodically acquiring resources allocation over PDCCH. A SPS configuration index represents a set of SPS information, including the periodical RB assignments, Modulation and Coding Scheme ("MCS"), an interval between the current scheduled resource and the next scheduled resource in time, etc.

If the radio conditions change, a new allocation is triggered (over PDCCH). Also, any incremental redundancy (HARQ subsequent transmissions) is separately scheduled using dynamic scheduling. Also, to avoid the wasting of resources when a data transfer is completed, there are several mechanisms for deactivating SPS (explicit, inactivity timer, etc.).

Additionally, an eNB can configure multiple SPS configurations each of which may have different parameters such as the interval between scheduled resources in time. The UE can report the assistance information to the eNB to indicate the expected interval, time offset, maximum message size, etc. The eNB can activate/release the SPS configuration based on the reported information.

The legacy SPS mechanism for UL/DL transmission can apply to the PC5-based SL transmission. As shown in FIG. 3, eNB prepares three SL SPS configurations for (mode 3) UE. The (mode 3) UE detects that a V2X message with a period of one second is intended to be transmitted, and then the UE transmits assistant information to the eNB indicating that the message with a period of one second is intended to be transmitted. Correspondingly, the eNB transmits activation for SL-SPS-Config #1 with an interval of one second over PDCCH in response to the assistant information from the UE. After the V2X message with a period of one second are transmitted to eNB, the UE detects that some V2X messages with a period of 100 milliseconds is intended to be transmitted, then the UE transmits assistant information to the eNB indicating that some messages with a period of 100 milliseconds are intended to be transmitted. Correspondingly, the eNB transmits release for SL-SPS-Config #1 with a period of one second and activation for SL-SPS-Config #3 with a period of 100 milliseconds over PDCCH in response to the assistant information from the UE. The UE keeps transmitting the messages with a period of 100 milliseconds without transmitting the assistant information to eNB; the overhead for resources allocation over PDCCH is thereby decreased. Similar with the procedure for the activation/release of SL SPS configurations, the UE detects that a V2X message with a period of 500 milliseconds is intended to be transmitted, and then the UE transmits assistant information to the eNB indicating that a message with a period of 500 milliseconds is intended to be transmitted. Correspondingly, the eNB transmits the release for SL-SPS-Config #3 with a period of 100 milliseconds and activation for SL-SPS-Config #2 with a period of 500 milliseconds over PDCCH in response to the assistant information from the UE.

Figure 4:
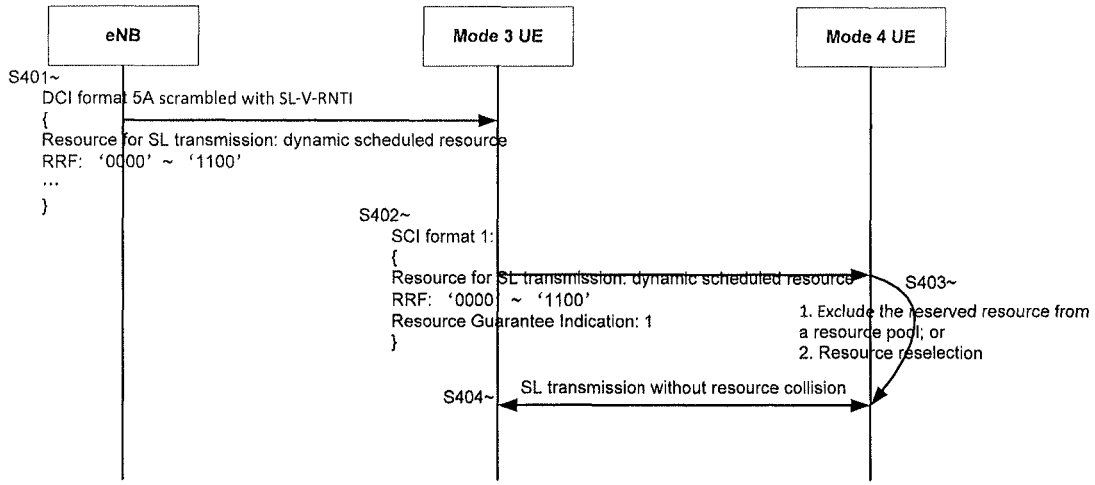
FIG. 4 is a call flow illustrating that RRF in DCI format 5A is used to indicate an interval between current scheduled resource and the reserved resource according to the first embodiment.

FIG. 4 is a call flow illustrating that RRF in DCI format 5A is used to indicate an interval between current scheduled resource and the reserved resource according to the first embodiment. As shown in FIG. 4, DCI format 5A is scrambled with SL-V-RNTI, which implies that the resource allocation for SL transmission is based on DS. In S401, eNB transmits a DCI format 5A scrambled with SL-V-RNTI to mode 3 UE, including resource allocation for SL transmission based on DS, and a RRF indicating an interval between the current scheduled resource and the reserved resource for a following SL transmission. In one embodiment, RRF in DCI is a field with a length of 4 bits, different values of which indicates different intervals. In another embodiment, RRF in DCI is same with a combination of a SL SPS configuration index of 3 bits and an activation/release indication of 1 bit. An example of explanation for RRF of 4 bits is shown in Table 1. The eNB shall set the RRF according to Table 1 based on the indicated value X, Wherein the indicated value X is equal to the interval provided by a higher layer divided by 100. For example, the interval between the current scheduled resource and the reserved resource for a following SL transmission is 8×100, 0.5×100 or 0.2×100 in the case that RRF is '1000', '1011', and '1100', respectively.

TABLE 1

Interval representation in RRF

| RRF in DCI format 5A | Indicated value X | Descriptions |
|---|---|---|
| '0001', '0010', . . . , '1010' | Decimal values equivalent of the field | The higher layer decides to keep the resource for the transmission of the next SL transport block while the value X meets $1 \leq X \leq 10$. |
| '1011' | 0.5 | The higher layer decides to keep the resource for the transmission of the next SL transport block while the value X is 0.5. |
| '1100' | 0.2 | The higher layer decides to keep the resource for the transmission of the next SL transport block while the value X is 0.2 |

TABLE 1-continued

Interval representation in RRF

| RRF in DCI format 5A | Indicated value X | Descriptions |
| --- | --- | --- |
| '0000' | 0 | The higher layer decides not to keep the resource for the transmission of the SL next transport block. |
| '1101', '1110', '1111' | Reserved | |

In summary, decimal values 1-10 equivalent of the resource reservation field of 4 bits indicate a corresponding extent of the interval between the current scheduled resource and the reserved resource, a decimal value 11 equivalent of the resource reservation field of 4 bits indicates 0.5 extent of the interval between the current scheduled resource and the reserved resource, a decimal value 12 equivalent of the resource reservation field of 4 bits indicates 0.2 extent of the interval between the current scheduled resource and the reserved resource, and a decimal value 0 equivalent of the resource reservation field of 4 bits indicates that no reserved resource is kept for the following transmission.

In S402, mode 3 UE sets the SCI format 1 according to DCI format 5A, particularly, RRF in SCI format 1 is same with RRF in DCI 5A, and so are the field for current schedule resource. Additionally, a field of Resource Guarantee Indication is introduced to indicate whether the reserved resource indicated in the RRF in the SCI can be occupied by the mode 4 UE. In one embodiment, the field of Resource Guarantee Indication has a length of 1 bits, and may reuse a reserved bit in SCI format 1. For example, the value '1' of Resource Guarantee Indication indicates the reserved resource indicated in the RRF in the SCI cannot be occupied by the mode 4 UE, while the value '0' of Resource Guarantee Indication indicates the reserved resource indicated in the RRF in the SCI can be occupied in the case that the ProSe Per-packet Priority ("PPPP") of SL transmission from mode 4 UE is higher than that of SL transmission from mode 3 UE.

In S403, in the context of Resource Guarantee Indication being '1', mode 4 UE deduces the reserved resource from the interval indicated in the RRF in the SCI format 1, and performs resource reselection in the case that the reserved resource has collision with resource used by itself for an ongoing SL transmission, alternatively, mode 4 UE excludes the reserved resource from a resource pool in the case that the reserved resource has not collision with resource used by itself for an ongoing SL transmission. Thereby, the resource collision can be avoided by the RRF setting in DCI/SCI.

In S404, SL transmission is carried out without resource collision. It will be appreciated that disclosure herein is not limited to usage of DCI format 5A and SCI format 1 in V2X scenarios, and moreover, DCI format 5 and SCI format 0 can also be used to carry the proper RRF indicating the interval between the current scheduled resource and the reserved resource in general D2D scenarios.

It will be appreciated the information of the reserved resource, such as the RRF in the DCI format 5A, is transmitted to mode 3 UE in the case of resource pool sharing between mode 3 and mode 4 UE, as well as the information of the reserved resource such as the RRF in the SCI format 1, and/or Resource Guarantee Indication is transmitted to mode 4 UE in the case of resource pool sharing between mode 3 and mode 4 UE.

Figure 5:
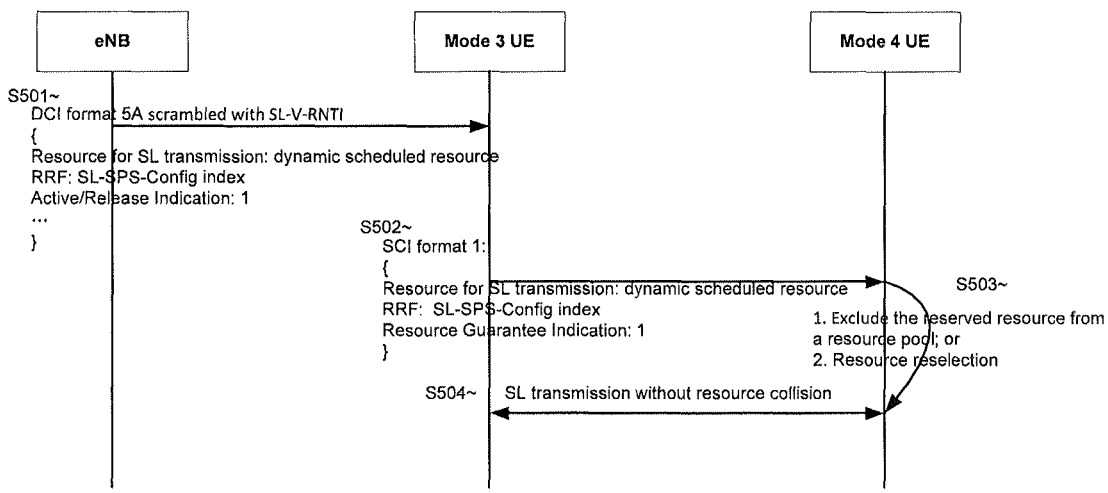
FIG. 5 is a call flow illustrating that RRF in DCI format 5A is set by a SL SPS configuration index according to the second embodiment.

FIG. 5 is a call flow illustrating that RRF in DCI format 5A is set by a SL SPS configuration index according to the second embodiment. The call flow shown in FIG. 5 is similar with that shown in FIG. 4, except that the RRF in DCI format 5A and/or SCI format 1 is set by a SL-SPS-Config index in S501 and/or S502, particularly, a SL-SPS-Config index of 3 bits. It is noted that although the SL-SPS-Config index other than an explicit interval is included in the RRF of DCI format 5A, the resource allocation for SL transmission of mode 3 UE is still based on DS because the DCI format 5A is scrambled with SL-V-RNTI. The interval between the current scheduled resource and the reserved resource for a following SL transmission is same with a SPS interval corresponding to the SL SPS configuration index.

Additionally, the RRF in the SCI format 1 being set by the SL SPS configuration index included in the RRF in DCI format 5A is determined based on an Active/Release Indication for the SL SPS configuration index in the DCI, Particularly, value '1' of Active/Release Indication represents that the RRF in the SCI format 1 is set by the SL-SPS-Config index included in the RRF in the DCI format 5A, as shown in step S502. Otherwise value '0' of Active/Release Indication represents that the RRF in the SCI format 1 is not set by the SL-SPS-Config index included in the RRF in the DCI format 5A, for example, the RRF in the SCI format 1 is set to be '0000'.

Further, in the case that mode 3 UE sets the RRF in the SCI format 1 with the SL-SPS-Config index, mode 4 UE deduces the interval from the SL-SPS-Config index included in the RRF.

Other processes are similar that in FIG. 4, thereby the descriptions thereof are omitted for the purpose of brevity.

It will be appreciated the information of the reserved resource, such as the RRF in the DCI format 5A, and/or Active/Release Indication, is transmitted to mode 3 UE in the case of resource pool sharing between mode 3 and mode 4 UE, as well as the information of the reserved resource such as the RRF in the SCI format 1, and/or Resource Guarantee Indication is transmitted to mode 4 UE in the case of resource pool sharing between mode 3 and mode 4 UE.

Figure 6:
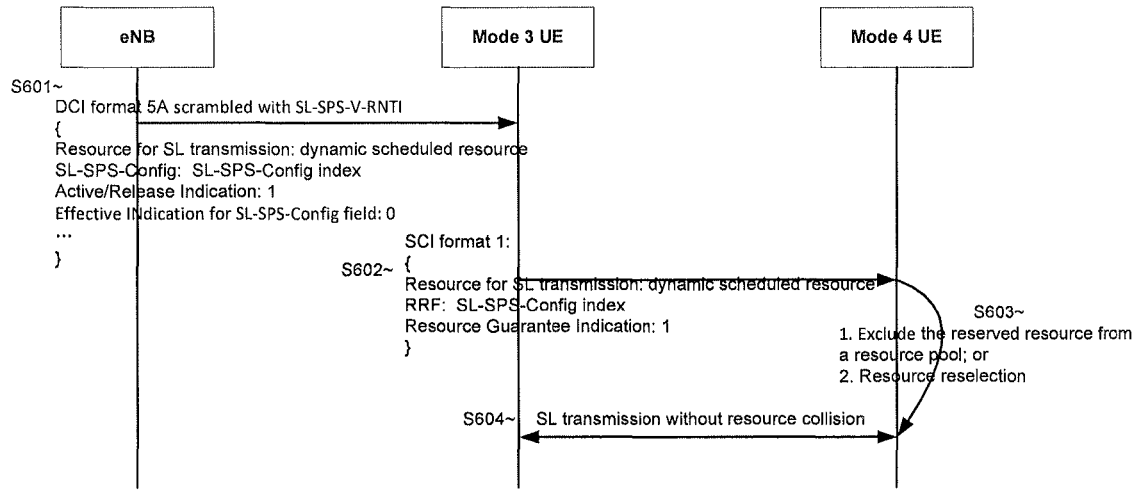
FIG. 6 is a call flow illustrating SL-SPS-Config field in the DCI format 5A is used to set RRF in SCI according to the value of Effective Indication for SL-SPS-Config field according to the third embodiment.

FIG. 6 is a call flow illustrating SL-SPS-Config field in the DCI format 5A is used to set RRF in SCI according to the value of Effective Indication for SL-SPS-Config field according to the third embodiment. As shown in FIG. 6, DCI format 5A is scrambled with SL-SPS-V-RNTI, however, the resource allocation for SL transmission may be based on DS or SPS according to the field of Effective Indication for SL-SPS-Config field.

In S601, eNB transmits a DCI format 5A scrambled with SL-SPS-V-RNTI to mode 3 UE, including resource allocation for SL transmission based on DS, and a field of SL-SPS-Config, a field of Active/Release Indication, and a field of Effective Indication for SL-SPS-Config field. The field of Effective Indication for SL-SPS-Config field indicates whether the SL-SPS-Config field is used to set the RRF in the SCI format 1, or indicate the SL transmission with SPS. In one embodiment, the value '0' of Effective Indication for SL-SPS-Config field represents that the SL-SPS-Config field in the DCI format 5A is used to set the RRF in the SCI format 1 and indicate the resource allocation for SL transmission is based on DS, while the value '1' of Effective Indication for SL-SPS-Config field represents that the SL-SPS-Config field is used to indicate the SL transmission with SPS.

Further, in the case that the value of Effective Indication for SL-SPS-Config field is '0', the field of Active/Release Indication is used to determine whether the RRF in the SCI format 1 is set by the SL SPS configuration index included in the RRF in DCI format 5A as explained in FIG. 5.

As shown in S602, mode 3 UE sets the RRF in the SCI format 1 by the SL-SPS-Config index included in the field of SL-SPS-Config in the case that resource allocation for SL transmission is based on DS, due to the value '0' of the Effective Indication for SL-SPS-Config field and the value '1' of the Active/Release Indication.

Similar with the description for FIG. 4, a field of Resource Guarantee Indication is introduced to indicate whether the reserved resource indicated in the RRF in the SCI can be occupied by the mode 4 UE. For example, the value '1' of Resource Guarantee Indication indicates the reserved resource indicated in the RRF in the SCI cannot be occupied by the mode 4 UE, while the value '0' of Resource Guarantee Indication indicates the reserved resource indicated in the RRF in the SCI can be occupied in the case that the PPPP of SL transmission from mode 4 UE is higher than that of SL transmission from mode 3 UE.

In step S603, mode 4 UE deduces the interval from the SL-SPS-Config index included in the RRF. Other processes are similar that in FIG. 4, thereby the descriptions thereof are omitted for the purpose of brevity.

It will be appreciated the information of the reserved resource, such as the RRF in the DCI format 5A, Active/Release Indication, or Effective Indication for SL-SPS-Config field, is transmitted to mode 3 UE in the case of resource pool sharing between mode 3 and mode 4 UE, as well as the information of the reserved resource such as the RRF in the SCI format 1, and/or Resource Guarantee Indication is transmitted to mode 4 UE in the case of resource pool sharing between mode 3 and mode 4 UE.

Figure 7:
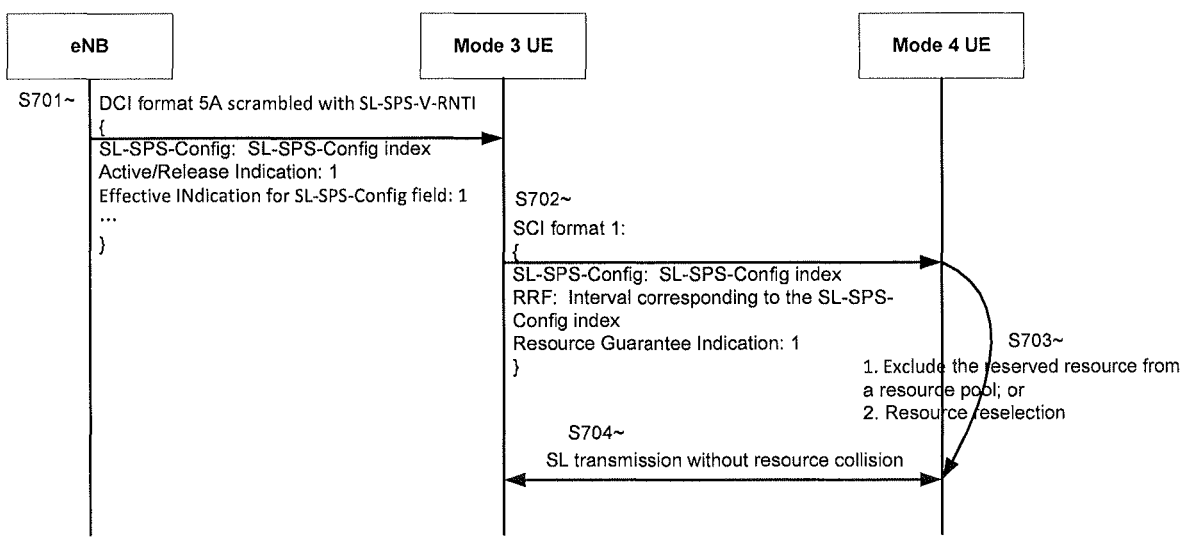
FIG. 7 is a call flow illustrating SL-SPS-Config field in the DCI format 5A is used to indicate SL transmission with SPS according to the value of Effective Indication for SL-SPS-Config field according to the fourth embodiment.

FIG. 7 is a call flow illustrating SL-SPS-Config field in the DCI format 5A is used to indicate SL transmission with SPS according to the value of Effective Indication for SL-SPS-Config field according to the fourth embodiment. As shown in FIG. 7, DCI format 5A is scrambled with SL-SPS-V-RNTI, the resource allocation for SL transmission is based on SPS according to the field of Effective Indication for SL-SPS-Config field.

In S701, eNB transmits a DCI format 5A scrambled with SL-SPS-V-RNTI to mode 3 UE, including a field of SL-SPS-Config, a field of Active/Release Indication, and a field of Effective Indication for SL-SPS-Config field. Comparing with the call flow in FIG. 6, the field of Effective Indication for SL-SPS-Config field with a value of '1' indicates the SL-SPS-Config field indicates the SL transmission with SPS. Further, the field of Active/Release Indication indicates whether to active/release the SL-SPS-Config index for SL transmission, as explained in the prior art.

In S702, mode 3 UE sets SL-SPS-Config field in the SCI format 1 with that in the received DCI format 5A, and sets RRF in the SCI format 1 with the interval corresponding to the SL-SPS-Config index. For example, mode 3 UE can deduce the interval from the SL-SPS-Config index in the received DCI format 5A, and mode 4 UE can deduce the interval from the SL-SPS-Config index included in the RRF in S703.

Similar with the description for FIG. 4, a field of Resource Guarantee Indication is introduced to indicate whether the reserved resource indicated in the RRF in the SCI can be occupied by the mode 4 UE. For example, the value '1' of Resource Guarantee Indication indicates the reserved resource indicated in the RRF in the SCI cannot be occupied by the mode 4 UE, while the value '0' of Resource Guarantee Indication indicates the reserved resource indicated in the RRF in the SCI can be occupied in the case that the PPPP of SL transmission from mode 4 UE is higher than that of SL transmission from mode 3 UE.

Other processes are similar that in FIG. 4, thereby the descriptions thereof are omitted for the purpose of brevity.

It will be appreciated the information of the reserved resource, such as the RRF in the DCI format 5A, Active/Release Indication, or Effective Indication for SL-SPS-Config field, is transmitted to mode 3 UE in the case of resource pool sharing between mode 3 and mode 4 UE, as well as the information of the reserved resource such as the RRF in the SCI format 1, and/or Resource Guarantee Indication is transmitted to mode 4 UE in the case of resource pool sharing between mode 3 and mode 4 UE.

Figure 8:
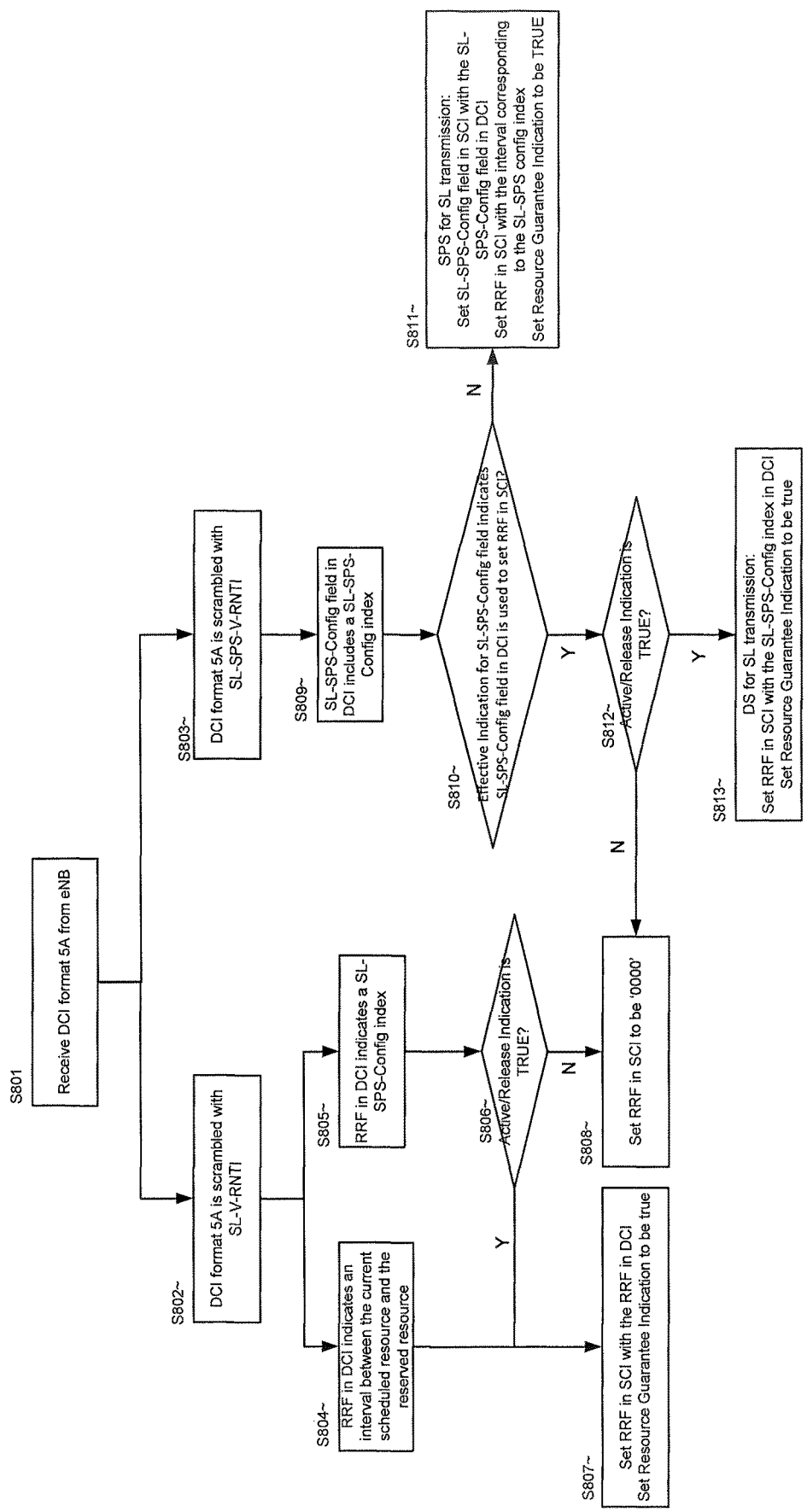
FIG. 8 is a process of mode 3 UE for RRF setting in SCI according to one embodiment.

FIG. 8 is a process of mode 3 UE for RRF setting in SCI according to one embodiment. The process begins at S801, wherein mode 3 UE receives a DCI format 5A from eNB over PDCCH. Mode 3 UE attempts to decode the DCI format 5A with SL-V-RNTI or SL-SPS-V-RNTI.

In the case that DCI format 5A is scrambled with SL-V-RNTI as shown in S802, mode 3 UE attempts to parse the RRF in the DCI format 5A according to a pre-defined algorithm for RRF explaining. In the case that the RRF in the DCI format 5A indicates an interval between the current scheduled resource and the reserved resource as shown in S804, the mode 3 UE sets the RRF in the SCI format 1 with the RRF in the DCI format 5A. That is, the RRF in the SCI format 1 represents the interval indicated in the RRF in the DCI format 5A in this case. Optionally, the mode 3 UE sets Resource Guarantee Indication to be true or '1' in one or more of the following scenarios: i.) the resource allocation for SL transmission of mode 3 UE is based on dynamic scheduling; ii.) Service transmitted by mode 3 UE is more reliable, or the reliability requirement thereof is higher than a (pre-)configured value; iii.) constant bit rates ("CBR") for a resource pool of mode 3 UE is higher than a (pre-)configured value.

In the case that the RRF in the in DCI format 5A indicates a SL SPS configuration index as shown in S805, the mode 3 UE decides whether the Active/Release Indication is TRUE or '1' in S806. If it's TRUE or '1' (Yes in S806), the process continues to S807, wherein, the mode 3 UE sets the RRF in the SCI format 1 with the RRF in the DCI format 5A. That is, the RRF in the SCI format 1 is set by the SL-SPS-Config index included in the RRF in the DCI format 5A, and the interval is same with the SL SPS interval corresponding to the SL SPS configuration index. If it's FALSE or '0' (No in S806), the mode 3 UE sets the RRF in the SCI format 5A to be '0000' in S808, or leaves it for the default value.

In the case that DCI format 5A is scrambled with SL-SPS-V-RNTI as shown in S803, mode 3 UE obtains a SL-SPS-Config index from the SL-SPS-Config field in the DCI format 5A as shown in S809. In S810, mode 3 UE decides whether Effective Indication for SL-SPS-Config field indicates SL-SPS-Config field in the DCI format 5A is used to set RRF in SCI. If No in S810, that is, Effective Indication for SL-SPS-Config field is used to indicate the SL transmission with SPS, mode 3 UE prepares a SL transmission based on SPS, such as, by setting SL-SPS-Config field in SCI with the SL-SPS-Config field in DCI, setting RRF to indicate the interval for SL SPS, etc. Optionally, mode 3 UE sets Resource Guarantee Indication to be TRUE or '1', to indicate to mode 4 UE that the reserved resource cannot be occupied.

If Yes in 810, that is, Effective Indication for SL-SPS-Config field is used to set RRF in SCI, mode 3 UE prepares a SL transmission based on DS and continues to S812. In S812, mode 3 UE decides whether the Active/Release Indication is TRUE or '1'. If it's TRUE or '1' (Yes in S812), the process continues to S813, wherein, the mode 3 UE sets the RRF in the SCI format 1 with the SL-SPS-Config index in the DCI format 5A. That is, the RRF in the SCI format 1 is set by the SL-SPS-Config index included in the SL-SPS-Config field in the DCI format 5A, and the interval is same with the SL SPS interval corresponding to the SL SPS configuration index. If it's FALSE or '0' (No in S812), the mode 3 UE sets the RRF in the SCI format 5A to be '0000' in S808, or leaves it for the default value It will be appreciated the information of the reserved resource, such as the RRF in the DCI format 5A, Active/Release Indication, or Effective Indication for SL-SPS-Config field, is transmitted to mode 3 UE in the case of resource pool sharing between mode 3 and mode 4 UE.

Figure 9:
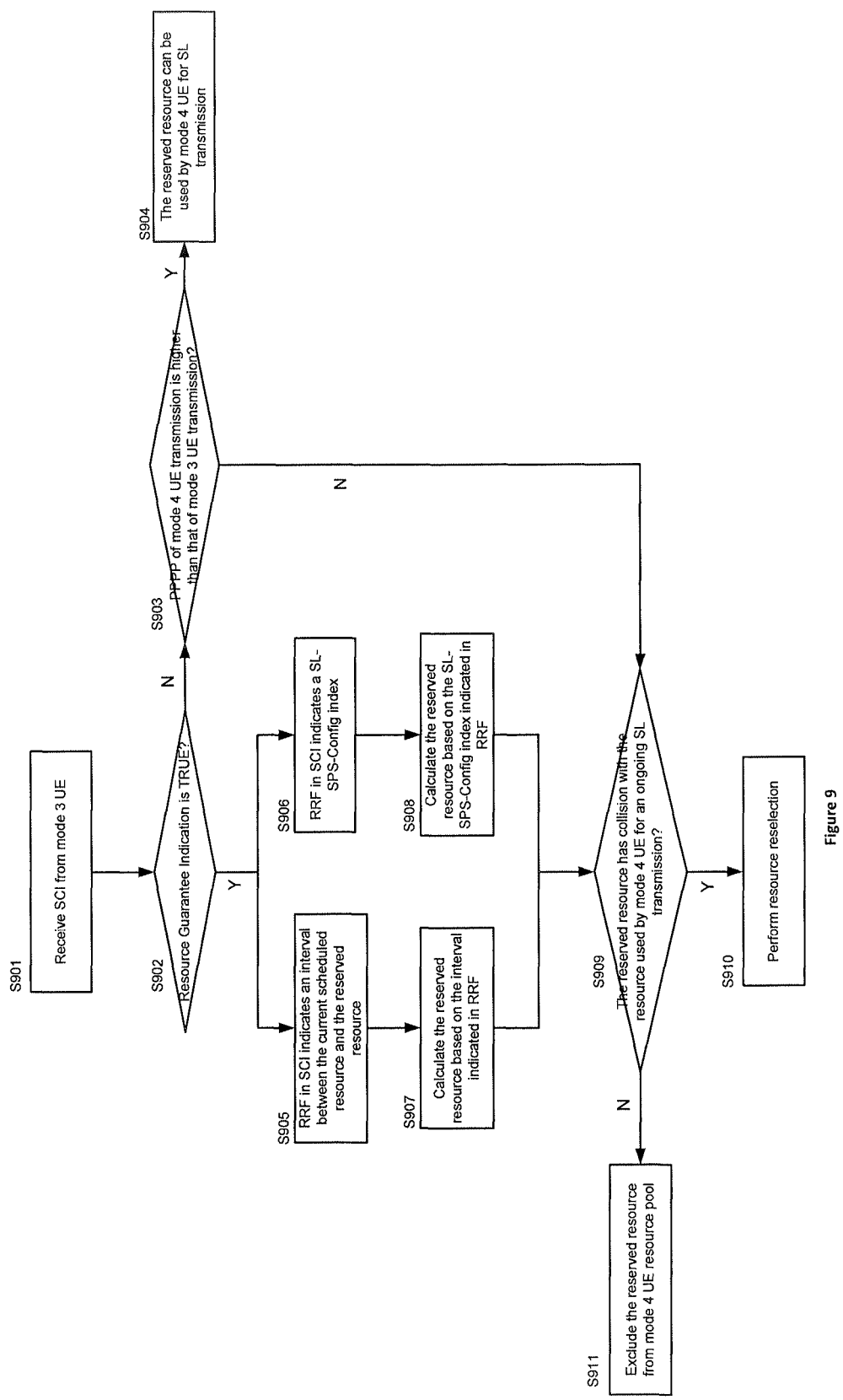
FIG. 9 is a process of mode 4 UE for resource collision avoidance on SL according to one embodiment.

FIG. 9 is a process of mode 4 UE for resource collision avoidance on SL according to one embodiment. The process begins at S901, wherein mode 4 UE receives a SCI format 1 from mode 3 UE over PSCCH. Mode 4 UE decides whether the Resource Guarantee Indication is TRUE or '1' in S902. If it's No in S902, that is, the reserved resource indicated in the RRF can be occupied by the SL transmission of mode 4 UE, mode 4 UE decides whether PPPP of mode 4 UE transmission is higher than that of mode 4 UE transmission in S903. If Yes in S903, the process continues to S904, wherein the reserved resource in the SCI format 1 can be used by mode 4 UE for SL transmission. If No in S903, the process continues to S909, wherein mode 4 UE may decide whether the reserved resource has collision with the resource used by itself for an ongoing SL transmission. If Yes in S909, the process continues to S910, wherein mode 4 may perform resource reselection. If No in S909, the process continues to S911, wherein mode 4 UE may exclude the reserved resource from the resource pool thereof.

If it's Yes in S902, that is, the reserved resource indicated in the RRF cannot be occupied by the SL transmission of mode 4 UE, mode 4 UE attempts to parse the RRF in the SCI format 1 according to a pre-defined algorithm for RRF explaining. In the case that the RRF in the SCI format 1 indicates an interval between the current scheduled resource and the reserved resource as shown in S905, the mode 4 UE calculates the reserved resource based on the interval indicated in RRF as shown in S907. In the case that the RRF in the SCI format 1 indicates a SL-SPS-Config index as shown in S906, the mode 4 UE deduces the interval from the SL-SPS-Config index, and then calculate the reserved resource as shown in S908. No matter which algorithm in S905 and S906 is used, mode 4 UE get the knowledge of the reserved resource for a following SL transmission of mode 3 UE, and then decides whether the reserved resource has collision with the resource used by itself for an ongoing SL transmission in S909. If Yes in S909, the process continues to S910, wherein mode 4 performs resource reselection. If No in S909. the process continues to S911, wherein mode 4 UE excludes the reserved resource from the resource pool thereof. It is noted that even the PPPP of mode 4 UE transmission is higher than that of mode 4 UE transmission when the Resource Guarantee Indication is TRUE or '1', mode 4 UE will perform resource reselection or excludes the reserved resource from the resource pool thereof in order to avoid the resource collision. Thereby, the resource collision between SL transmission of mode 3 UE and mode 4 UE can be avoided.

It will be appreciated the information of the reserved resource such as the RRF in the SCI format 1, and/or Resource Guarantee Indication is transmitted to mode 4 UE in the case of resource pool sharing between mode 3 and mode 4 UE.

It will be appreciated that processes described in FIGS. 8 and 9 are not limited to the usage of DCI format 5A and SCI format 1 in V2X scenarios, and moreover, in general D2D scenarios, DCI format 5 and SCI format 0 can also be used to carry the proper RRF explicitly indicating the interval between the current scheduled resource and the reserved resource or implicitly indicating the interval by a SL-SPS-Config index.

One skilled in the relevant art will recognize, however, that the process described in FIGS. 8 and 9 need not necessarily be practiced in the sequence shown in the Figures, and are able to be practiced without one or more of the specific steps, or with other steps not shown in the Figures.

Figure 10:
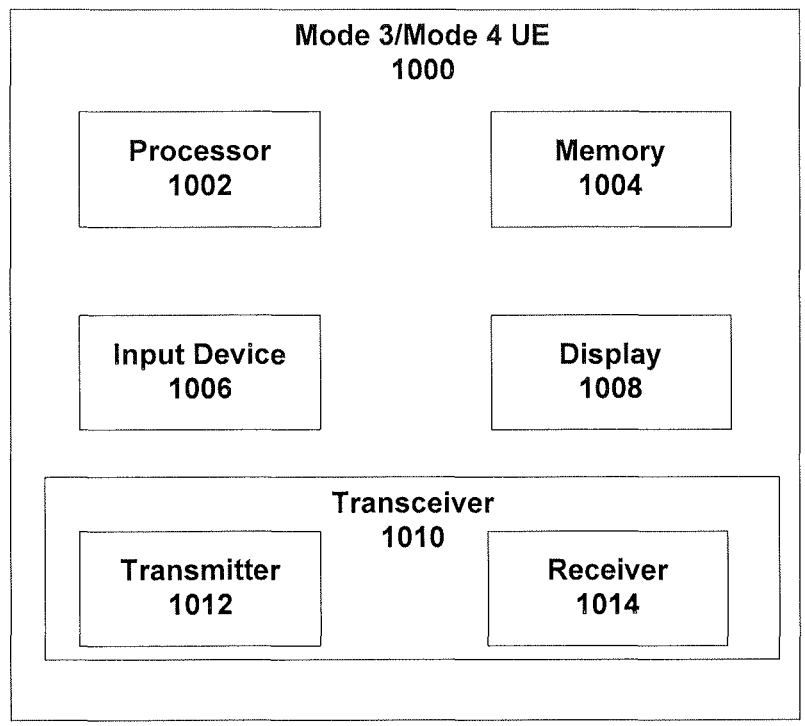
FIG. 10 is a schematic block diagram illustrating components of a mode 3/mode 4 UE according to one embodiment.

FIG. 10 is a schematic block diagram illustrating components of a mode 3/mode 4 UE according to one embodiment.

Mode 3/Mode 4 UE1000 is an embodiment of Mode 3/Mode 4 UE described from FIG. 4 to FIG. 9. Furthermore, Mode 3/Mode 4 UE 1000 may include a processor 1002, a memory 1004, and a transceiver 1010. In some embodiments, Mode 3/Mode 4 UE 1000 may include an input device 1006 and/or a display 1008. In certain embodiments, the input device 1006 and the display 1008 may be combined into a single device, such as a touch screen.

The processor 1002, in one embodiment, may include any known controller capable of executing computer-readable instructions and/or capable of performing logical operations. For example, the processor 1002 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 1002 executes instructions stored in the memory 1004 to perform the methods and routines described herein. The processor 1002 is communicatively coupled to the memory 1004, the input device 1006, the display 1008, and the transceiver 1010.

In some embodiments, the processor 1002 controls the transceiver 1010 to transmit UL signals to Network Equipment 1100 and/or receive DL signals from Network Equipment 1100. For example, the processor 1002 of Mode 3 UE may control the transceiver 1010 to transmit assistant information to Network Equipment 1100 indicating expected payload size and/or interval of SL transmission data thereof. In another example, the processor 1002 may control the transceiver 1010 to receive a download control signaling such as a DCI format fomat 5A over PDCCH including RRF, as described above. In certain embodiments, the processor 1002 may monitor DL signals received via the transceiver 1010 for specific messages. For example, the processor 1002 may monitor if DCI format 5A is scrambled with SL-V-RNTI or SL-SPS-V-RNTI, as described above.

The memory 1004, in one embodiment, is a computer readable storage medium. In some embodiments, the memory 1004 includes volatile computer storage media. For example, the memory 1004 may include a RAM, including dynamic RAM ("DRAM"), synchronous dynamic RAM ("SDRAM"), and/or static RAM ("SRAM"). In some embodiments, the memory 1004 includes non-volatile computer storage media. For example, the memory 1004 may include a hard disk drive, a flash memory, or any other suitable non-volatile computer storage device. In some embodiments, the memory 1004 includes both volatile and non-volatile computer storage media. In some embodiments, the memory 1004 stores data relating to received DCI from Network Equipment 1100. In some embodiments, the memory 1004 also stores program code and related data, such as an operating system or other controller algorithms operating on Mode 3/Mode 4 UE 1000.

Mode 3/Mode 4 UE 1000 may optionally include an input device 1006. The input device 1006, in one embodiment, may include any known computer input device including a touch panel, a button, a keyboard, a stylus, a microphone, or the like. In some embodiments, the input device 1006 may be integrated with the display 1008, for example, as a touch screen or similar touch-sensitive display. In some embodiments, the input device 1006 includes a touch screen such that text may be input using a virtual keyboard displayed on the touch screen and/or by handwriting on the touch screen. In some embodiments, the input device 1006 includes two or more different devices, such as a keyboard and a touch panel. In certain embodiments, the input device 1006 may include one or more sensors for monitoring an environment of Mode 3/Mode 4 UE 1000.

Mode 3/Mode 4 UE 1000 may optionally include a display 1008. The display 1008, in one embodiment, may include any known electronically controllable display or display device. The display 1008 may be designed to output visual, audible, and/or haptic signals. In some embodiments, the display 1008 includes an electronic display capable of outputting visual data to a user. For example, the display 1008 may include, but is not limited to, an LCD display, an LED display, an OLED display, a projector, or a similar display device capable of outputting images, text, or the like to a user. As another, non-limiting, example, the display 1008 may include a wearable display such as a smart watch, smart glasses, a heads-up display, or the like. Further, the display 1008 may be a component of a smart phone, a personal digital assistant, a television, a table computer, a notebook (laptop) computer, a personal computer, a vehicle dashboard, or the like.

In certain embodiments, the display 1008 may include one or more speakers for producing sound. For example, the display 1008 may produce an audible alert or notification (e.g., a beep or chime). In some embodiments, the display 1008 includes one or more haptic devices for producing vibrations, motion, or other haptic feedback. In some embodiments, all or portions of the display 1008 may be integrated with the input device 1006. For example, the input device 1006 and display 1008 may form a touch screen or similar touch-sensitive display. In other embodiments, the display 1008 may be located near the input device 1006.

The transceiver 1010, in one embodiment, is configured to communicate wirelessly with Network Equipment 1100. In certain embodiments, the transceiver 1010 comprises a transmitter 1012 and a receiver 1014. The transmitter 1012 is used to transmit UL communication signals to Network Equipment 1200 and the receiver 1014 is used to receive DL communication signals from Network Equipment 1200 in the case of Mode 3 UE. For example, the transmitter 1012 may transmit assistant information indicating the expected payload size and/or interval of SL transmission data thereof. As another example, the receiver 1014 may receive DCI such as DCI format 5A from Network Equipment 1100. The transmitter 1012 is used to transmit SL communication signals to Mode 3 UE and the receiver 1014 is used to receive SL communication signals from Mode 3 UE in the case of Mode 4 UE. For example, the receiver 1014 may receive SCI such as SCI format 1 from Mode 3 UE.

The transmitter 1012 and the receiver 1014 may be any suitable types of transmitters and receivers. Although only one transmitter 1012 and one receiver 1014 are illustrated, the transceiver 1010 may have any suitable number of transmitters 1012 and receivers 1014. For example, in some embodiments, Mode 3/Mode 4 UE 1000 includes a plurality of transmitter 1012 and receiver 1014 pairs for communicating on a plurality of wireless networks and/or radio frequency bands, each transmitter 1012 and receiver 1014 pair configured to communicate on a different wireless network and/or radio frequency band than the other transmitter 1012 and receiver 1014 pairs.

Figure 11:
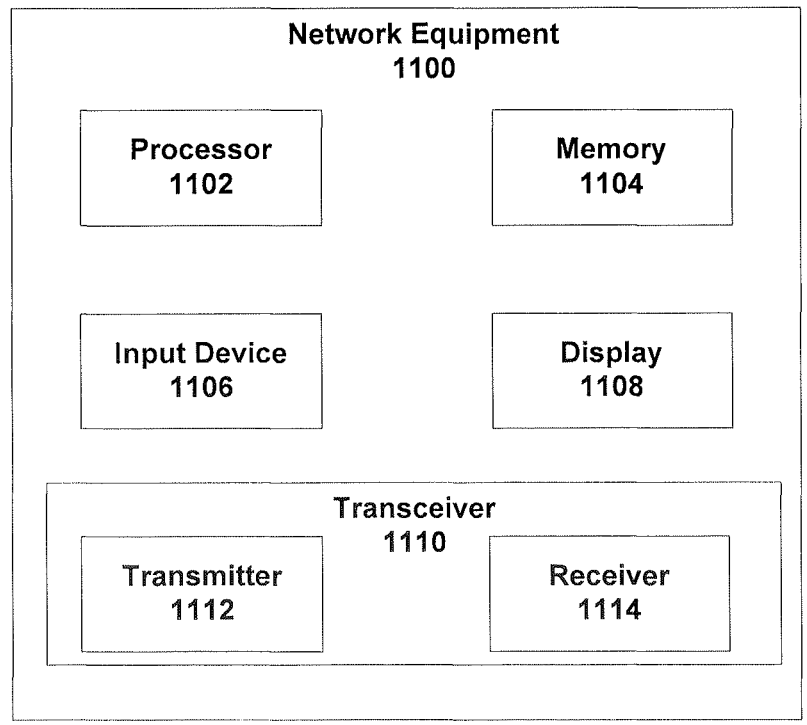
FIG. 11 is a schematic block diagram illustrating components of a network equipment according to one embodiment.

FIG. 11 is a schematic block diagram illustrating components of a network equipment according to one embodiment.

Network Equipment 1100 includes one embodiment of eNB described from FIG. 4 to FIG. 9. Furthermore, Network Equipment 1100 may include a processor 1102, a memory 1104, an input device 1106, a display 1108, and a transceiver 1110. As may be appreciated, the processor 1102, the memory 1104, the input device 1106, and the display 1108 may be substantially similar to the processor 1102, the memory 1104, the input device 1106, and the display 1108 of Mode 3/Mode 4 UE 1000, respectively.

In some embodiments, the processor 1102 controls the transceiver 1110 to transmit DL signals to Mode 3 UE 1000. The processor 1102 may also control the transceiver 1110 to receive UL signals from Mode 3 UE 1000. For example, the processor 1102 may control the transceiver 1110 to receive assistant information indicating expected payload size and/or interval of SL transmission data of Mode 3 UE 1000. In another example, the processor 1102 may control the transceiver 1110 to transmit a download control signaling such as a DCI format over PDCCH, as described above.

The transceiver 1110, in one embodiment, is configured to communicate wirelessly with Mode 3 UE 1000. In certain embodiments, the transceiver 1110 comprises a transmitter 1112 and a receiver 1114. The transmitter 1112 is used to transmit DL communication signals to Mode 3 UE 1000 and the receiver 1114 is used to receive UL communication signals from Mode 3 UE 1000. For example, the receivers 1114 may receive assistant information from Mode 3 UE 1000. As another example, the transmitter 1112 may transmit DCI such as DCI format 5A from Network Equipment 1100.

The transceiver 1110 may communicate simultaneously with a plurality of Mode 3 UE 1000. For example, the transmitter 1112 may transmit DL communication signals to Mode 3 UE 1000. As another example, the receiver 1114 may simultaneously receive UL communication signals from Mode 3 UE 1000. The transmitter 1112 and the receiver 1114 may be any suitable types of transmitters and receivers. Although only one transmitter 1112 and one receiver 1114 are illustrated, the transceiver 1110 may have any suitable number of transmitters 1112 and receivers 1114. For example, Network Equipment 1100 may serve multiple cells and/or cell sectors, wherein the transceiver 1110 includes a transmitter 1112 and a receiver 1114 for each cell or cell sector.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus comprising:
   a processor that determines reserved resource on sidelink for a following sidelink transmission; and
   a transceiver that transmits information of the reserved resource to a mode 4 user equipment in a resource reservation field in sidelink control information
   wherein the transceiver, transmits a resource guarantee indication to the mode 4 user equipment which indicates whether the reserved resource indicated in the resource reservation field in the sidelink control information can be occupied by the mode 4 user equipment.

2. The apparatus according to claim 1, wherein the processor determines the reserved resource on sidelink according to downlink control information received from a base station.

3. The apparatus according to claim 1, wherein, the resource reservation field in the sidelink control information indicates an interval between current scheduled resource and the reserved resource.

4. The apparatus according to claim 3, the resource reservation field in the sidelink control information has a length of 4 bits and is same with a combination of a sidelink semi-persistent scheduling configuration index of 3 bits and an activation/release indication of 1 bit, wherein decimal values 1-10 equivalent of the resource reservation field of 4 bits indicate a corresponding extent of the interval between the current scheduled resource and the reserved resource, a decimal value 11 equivalent of the resource reservation field of 4 bits indicates 0.5 extent of the interval between the current scheduled resource and the reserved resource, a decimal value 12 equivalent of the resource reservation field of 4 bits indicates 0.2 extent of the interval between the current scheduled resource and the reserved resource, and a decimal value 0 equivalent of the resource reservation field of 4 bits indicates that no reserved resource is kept for the following transmission.

5. The apparatus according to claim 1, wherein, the resource reservation field in the sidelink control information is set by a sidelink semi-persistent scheduling configuration index and an interval between the current scheduled resource and the reserved resource is same with a semi-persistent scheduling interval corresponding to the sidelink semi-persistent scheduling, configuration index.

6. The apparatus according to claim 5, wherein, a determination of the reserved resource field in the sidelink control information being set by a sidelink semi-persistent scheduling configuration index is based on an active/release indication for sidelink semi-persistent scheduling configuration index in the downlink control information.

7. The apparatus according to claim 3, wherein, the reserved resource field in the sidelink control information is set according to a resource reservation field in the downlink control information scrambled with sidelink-vehicle-radio network temporary identity received from the base station.

8. The apparatus according to claim 5, wherein, the reserved resource field in the sidelink control information is set according to a sidelink semi-persistent scheduling configuration field in the downlink control information scrambled with sidelink-semi-persistent scheduling-vehicle-radio network temporary identity received from the base station.

9. The apparatus according to claim 8, wherein, a determination of the reserved resource field in the sidelink control information being set according to a sidelink semi-persistent scheduling configuration field in the downlink control information is based on an effective indication for the sidelink semi-persistent scheduling configuration field in the downlink control information.

10. The apparatus according to claim 1, wherein, the information of the reserved resource is transmitted in the case of resource pool sharing between the apparatus and the mode 4 user equipment.

11. An apparatus comprising:
    a processor that determines reserved resource on sidelink for a following sidelink transmission; and
    a transceiver that, transmits information of the reserved resource to a mode 3 user equipment in downlink control information
    wherein, a resource reservation field in the downlink control information scrambled with sidelink-vehicle-radio network temporary identity is used to transmit the information of the reserved resource and set a reserved resource field in sidelink control information.

12. The apparatus according to claim 11 wherein, the resource reservation field in the downlink control information is used to indicate an interval between current scheduled resource and the reserved resource.

13. The apparatus according to claim 12, the resource reservation field in the downlink control information has a length of 4 bits and is same with a combination of a sidelink semi-persistent scheduling configuration index of 3 bits and an activation/release indication of 1 bit, wherein decimal values 1-10 equivalent of the resource reservation field of 4 bits indicate a corresponding extent of the interval between the current scheduled resource and the reserved resource, a decimal value 11 equivalent of the resource reservation field of 4 bits indicates 0.5 extent of the interval between the current scheduled resource and the reserved resource, a decimal value 12 equivalent of the resource reservation field of 4 bits indicates 0.2 extent of the interval between the current scheduled resource and the reserved resource, and a decimal value 0 equivalent of the resource reservation field of 4 bits indicates that no reserved resource is kept for the following transmission.

14. The apparatus according to claim 11, wherein, the resource reservation field in the downlink control information is set by a sidelink semi-persistent scheduling configuration index and an interval between the current scheduled resource and the reserved resource is same with a semi-persistent scheduling interval corresponding to the sidelink semi-persistent scheduling configuration index.

15. The apparatus according to claim 14, wherein, an active/release indication for sidelink semi-persistent scheduling configuration index in the downlink control information is used to indicate whether the reserved resource held in the sidelink control information is set by the sidelink semi-persistent scheduling configuration index.

16. The apparatus according to claim 11, wherein, a sidelink semi-persistent scheduling configuration field in the downlink control information scrambled with sidelink-semi-persistent scheduling-vehicle-radio network temporary identity is used to transmit the information of the reserved resource, and a sidelink semi-persistent scheduling configuration index included in the SL sidelink semi-persistent scheduling configuration field in the downlink control information is used to set a reserved resource field in sidelink control information.

17. The apparatus according to claim 16, wherein, an effective indication for the sidelink semi-persistent scheduling configuration field in the downlink control information is used to indicate whether the reserved resource field in the sidelink control information is set according to the sidelink semi-persistent scheduling configuration field in the downlink control information.

18. The apparatus according to claim 11, wherein, the information of the reserved resource is transmitted in the case of resource pool sharing between the mode 3 user equipment and a mode 4 user equipment.

19. An apparatus comprising:
- a transceiver that receives information of reserved resource on sidelink from a mode 3 user equipment in a resource reservation field in sidelink control information; and
- a processor that determines existence of resource collision on sidelink.

20. The apparatus according to claim 19, wherein the processor, performs resource reselection in the case that the reserved resource has collision with resource used by the apparatus for an ongoing sidelink transmission.

21. The apparatus according to claim 19, wherein the processor excludes the reserved resource from a resource pool if the reserved resource does not have a collision with resource used by the apparatus for an ongoing sidelink transmission.

22. The apparatus according to claim 19, wherein the transceiver, receives a resource guarantee indication from the mode 3 user equipment which indicates whether the reserved resource indicated in the resource reservation field in the sidelink control information can be occupied by the apparatus.

23. The apparatus according to claim 19, wherein, the resource reservation field in the sidelink control information indicates an interval between current scheduled resource and the reserved resource.

24. The apparatus according to claim 23, the resource reservation field in the sidelink control information has a length of 4 bits and is same with a combination of a sidelink semi-persistent scheduling configuration index of 3 bits and an activation/release indication of 1 bit, wherein decimal values 1-10 equivalent of the resource reservation field of 4 bits indicate a corresponding extent of the interval between the current scheduled resource and the reserved resource, a decimal value 11 equivalent of the resource reservation field of 4 bits indicates 0.5 extent of the interval between the current scheduled resource and the reserved resource, a decimal value 12 equivalent of the resource reservation field of 4 bits indicates 0.2 extent of the interval between the current scheduled resource and the reserved resource, and a decimal value 0 equivalent of the resource reservation field of 4 bits indicates that no reserved resource is kept for the following transmission.

25. The apparatus according to claim 19, wherein, the resource reservation field in the sidelink control information is set by a SL sidelink semi-persistent scheduling configuration index and an interval between the current scheduled resource and the reserved resource is same with a semi-persistent scheduling interval corresponding to the sidelink semi-persistent scheduling configuration index.

26. The apparatus according to claim 19, wherein, the information of the reserved resource is received in the case of resource pool sharing between the apparatus and the mode 3 user equipment.

* * * * *